Aug. 18, 1959  J. W. BERGEN  2,899,730
LACING HOOK
Filed Sept. 27, 1954
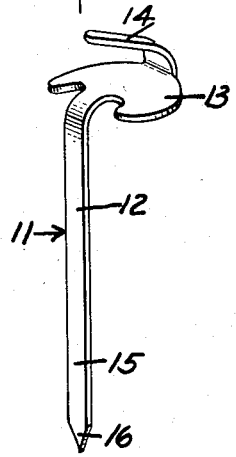
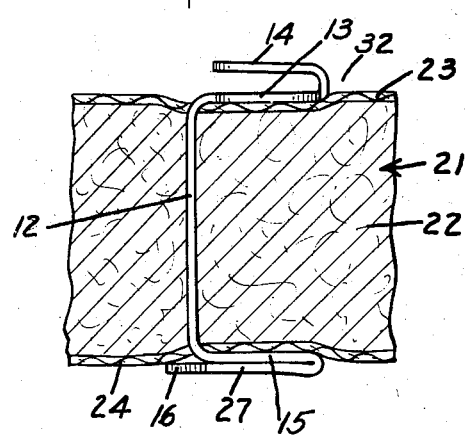
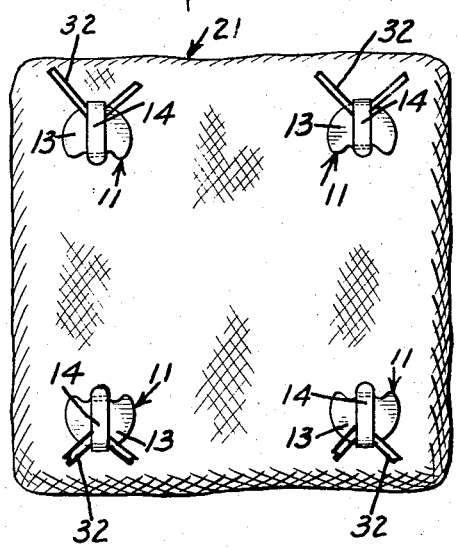
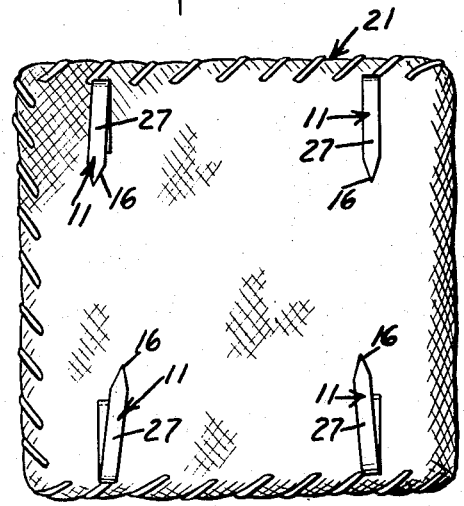
INVENTOR
JOSEPH BERGEN
BY George Sipkin
Lee S. Huntsberger
ATTORNEY United States Patent Office 2,899,730
Patented Aug. 18, 1959

2,899,730

LACING HOOK

Joseph W. Bergen, Braintree, Mass.

Application September 27, 1954, Serial No. 458,721

2 Claims. (Cl. 24—146)

(Granted under Title 35, U.S. Code (1952), sec. 266)

The invention described herein may be manufactured and used by or for the Government of the United States of America for governmental purposes without the payment of any royalties thereon or therefor.

The present invention concerns a lacing hook and in particular concerns a lacing hook for use on insulation pads.

Insulation for steam and other high temperature pipes is customarily provided by surrounding the pipe with an insulating sleeve of asbestos or like material. In order to cover irregular fittings in the pipes such as valves or pipe flanges, it is necessary to surround such irregular fittings with insulation blankets of asbestos or like material. Such blankets are small segments of insulating material that can be warped or wrapped around the irregular surfaces of the valve or flange.

When a plurality of insulation blankets are warped or fitted about a valve or flange, it is necessary to secure together the individual blankets and this can be done by sewing together the edges of the blanket in which case a permanent assembly is made that is not easily disassembled and reassembled.

In covering valves or flanges to which access will be frequently required, it is necessary to secure together the insulation blankets in a manner permitting ready assembly and reassembly. It has been proposed in the past to fasten together such individual blankets by attaching hooks to the blankets and lacing together the hooks with suitable lacing cord. Hooks that have been previously provided suffer the disadvantage of tearing loose from the insulation blanket or suffer the disadvantage of being extremely complicated in construction and therefore difficult to assemble; such hooks prove unreliable in use.

The present invention overcomes these disadvantages by providing a lacing hook that cannot possibly tear loose from an insulation blanket to which it is applied. The hook is the essence of simplicity in construction and therefore is easy to assemble and provides maximum reliability in use.

An object of the invention is to provide a lacing hook.

Another object is to provide a lacing hook for use on insulation pads.

Another object is to provide a lacing hook that cannot tear loose from an insulation pad to which it is applied and affords a maximum of reliability in use.

Another object is to provide a lacing hook formed of a minimum number of parts and which is easy to assemble with respect to an insulation pad.

Other objects and many of the attendant advantages of this invention will be readily appreciated as the same becomes better understood by reference to the following detailed description when considered in conection with the accompanying drawings wherein:

Fig. 1 is a perspective view of a preferred embodiment of the invention,

Fig. 2 is a side elevation showing the preferred embodiment applied to an insulation blanket, Fig. 3 is a top plan view of a blanket having four hooks thereto applied, and Fig. 4 is a bottom plan view as seen from the reverse side of Fig. 3.

In the drawings there is shown in Fig. 1 a perspective view of the preferred embodiment of hook that can be stamped from sheet metal such as tin metal. When stamped from sheet metal the hook is completely flat and is subsequently bent in stages both before and after assembly with an insulation pad. The preferred embodiment of hook 11 comprises a shank 12 near one end of which is an enlarged head 13, beyond which is formed a hook prong 14. At its other end hook 11 comprises a foot 15 beyond which is formed a pointed tip 16.

Shank 12 is preferably of rectangular cross section and enlarged head 13 may be of generally round shape or oval shape as shown or alternatively may be of rectangular or other shape. Hook prong 14 and foot 15 are both of preferably rectangular cross section of the approximate dimensions of shank 12. Tip 16 is preferably pointed.

As seen in Fig. 1 after hook 11 is stamped as a flat blank from sheet material, head 13 is bent at approximately right angle to shank 12 and hook prong 14 is doubled back above head 13 and in spaced relation and approximately parallel thereto. Hook 11 thus conformed is shown in Fig. 1 and is ready to be applied to an insulation blanket.

In Fig. 2 there is shown an insulation blanket 21 that is formed from a body 22 of asbestos shorts and fibers. There are facings 23 and 24 on opposite sides of blanket 22, the facings 23 and 24 being formed of asbestos cloth. Hook 11 is applied to insulation blanket 21 by driving tip 16 and foot 15 and shank 12 through cover 23 and body 22 of insulation blanket 21 until head 13 is pressed into cover 23 and foot 15 together with tip 16 project outwardly beyond cover 24.

Foot 15 is then bent at approximately right angles to shank 12 in the same direction that head 13 is bent so that foot 15 presses into cover 24 and is approximately parallel to and spaced from head 13. Foot 15 is then bent back upon itself as shown at 27 with tip 16 projecting slightly beyond shank 12.

A top plan view of insulation blanket 21 is shown in Fig. 3 with four hooks 11 assembled with respect thereto. A bottom plan view of insulation blanket 21 is shown in Fig. 4 with hooks 11 projecting therefrom.

A plurality of insulation blankets 21 can be secured together by threading suitable lacing 32 through hooks 11 in adjacent insulation pads 21 to thereby lace the individual pads 21 into a complete cover that is warped or fitted about a pipe valve or flange. In operation it is impossible to tear a hook 11 loose from insulation pads 21 regardless of how much tension is placed upon hook prong 14 by lacing 32 because of the fact that foot 15 in being bent at right angles to shank 12 cannot be pulled back through insulation body 22 along the path that it followed during assembly. A second feature of construction insuring that a hook 11 cannot possibly become disassembled from insulation pad 21 is the bending back upon itself of foot 15 as shown at 27. This bending back upon itself stiffens foot 15 and insures that it cannot possibly be flexed sufficiently so that foot 15 can be pulled back through body 22. A third feature that insures hook 11 against being disassembled is overlap of tip 16 with cover 24 to provide an anchor whereby tip 16 cannot be dislodged and withdrawn through body 22.

Enlargement of head 13 transversely prevents sideways rocking of hook 11 in assembled position and thereby prevents loosening of hook 11 regardless of the tension placed upon hook prong 14 by lacing 32. The rectangular cross section of shank 12 prevents twisting of hook 11 in the assembled position and thus prevents enlarging of the opening in body 22 caused by piercing of hook 11.

Obviously many modifications and variations of the present invention are possible in the light of the above teachings. It is therefore to be understood that within the scope of the appended claims the invention may be practiced otherwise than as specifically described.

I claim:

1. A lacing hook adapted for assembly with a temperature insulating blanket, said lacing hook being of sheet metal and including a first elongated section adapted to extend from one blanket surface through said blanket in intimate contact therewith to the other blanket surface and whose width is substantially greater than its thickness to resist any force tending to turn said elongated section in said blanket about its long dimension, one wide face of said elongated section facing a predetermined direction, a head section adapted to engage face-to-face with one surface of said blanket and integrally joined at a portion of the periphery thereof with one end of said elongated section and extending in predetermined direction, said head section being several times wider than said elongated section extending to a substantial extent in both directions transverse to its junction with said elongated section to resist any force tending to rock said lacing hook transversely in said blanket, a hook prong overlaying said head section in spaced relation thereto and integrally joined at one end with said head section at a peripheral portion thereof opposite its junction with said elongated section whereby lacing may be readily inserted between said head section and said hook prong to engage said hook prong, a second elongated section of substantially the same cross section dimensions as said first elongated section integrally joined at one end to the other end of said first section and extending transversely from said first section and adapted to contact face-to-face with the other surface of said blanket and doubled back upon itself with its free end extending back substantially beyond the junction of said first and second sections to resist any tensile force applied to said lacing hook at the hook prong end from pulling said lacing hook through said blanket, the length of said first section which is adapted to extend through said blanket being such that said blanket is under some compression between said head section and said second section of said lacing hook so that said lacing hook firmly grips said blanket.

2. A lacing hook adapted for assembly with a temperature insulating blanket, said lacing hook being of sheet metal and including a first elongated section adapted to extend from one blanket surface through said blanket in intimate contact therewith to the other blanket surface, a head section adapted to engage face-to-face with one surface of said blanket and integrally joined at a portion of the periphery thereof with one end of said elongated section and extending in said predetermined direction, said head section being several times wider than said elongated section extending to a substantial extent in both directions transverse to its junction with said elongated section to resist any force tending to rock said lacing hook transversely in said blanket and thereby loosen it, a hook prong overlaying said head section in spaced relation thereto and integrally joined at one end with said head section at a peripheral portion thereof opposite its junction with said elongated section whereby lacing may be readily inserted between said head section and said hook prong to engage said hook prong, a second elongated section of substantially the same cross section dimensions as said first elongated section integrally joined at one end to the other end of said first section and extending transversely from said first section and adapted to contact face-to-face with the other surface of said blanket and doubled back upon itself with its free end extending back substantially beyond the junction of said first and second sections to resist any tensile force applied to said lacing hook at the hook prong end from pulling said lacing hook through said blanket, the length of said first section which is adapted to extend through said blanket being such that said blanket is under some compression between said head section and said second section of said lacing hook so that said lacing hook firmly grips said blanket.

References Cited in the file of this patent

UNITED STATES PATENTS

| | | |
|---|---|---|
| 880,251 | Stimpson | Feb. 25, 1908 |
| 1,480,952 | Potter | Jan. 15, 1924 |
| 1,557,996 | Ennis | Oct. 20, 1925 |
| 1,638,763 | Ennis | Aug. 9, 1927 |
| 1,978,632 | Hoff et al. | Oct. 30, 1934 |
| 2,390,632 | Abrams et al. | Dec. 11, 1945 |
| 2,529,497 | Innacelli | Nov. 14, 1950 |

FOREIGN PATENTS

| | | |
|---|---|---|
| 7,964 | Great Britain | 1900 |